United States Patent
Tokuda et al.

(10) Patent No.: US 12,529,590 B2
(45) Date of Patent: Jan. 20, 2026

(54) WHEEL LOAD ESTIMATION DEVICE, METHOD, AND PROGRAM

(71) Applicant: SUMITOMO RUBBER INDUSTRIES, LTD., Kobe (JP)

(72) Inventors: Kazuma Tokuda, Kobe (JP); Yusuke Maeda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 317 days.

(21) Appl. No.: 18/232,161

(22) Filed: Aug. 9, 2023

(65) Prior Publication Data

US 2024/0060814 A1  Feb. 22, 2024

(30) Foreign Application Priority Data

Aug. 22, 2022  (JP) ................. 2022-132044

(51) Int. Cl.
G01G 19/12  (2006.01)

(52) U.S. Cl.
CPC ..................... G01G 19/12 (2013.01)

(58) Field of Classification Search
CPC ....... G01G 19/086; G01G 19/12; B60T 8/172
See application file for complete search history.

(56) References Cited

U.S. PATENT DOCUMENTS

| | | | |
|---|---|---|---|
| 10,336,142 B2 * | 7/2019 | Yamashita | B60C 23/00 |
| 2012/0245787 A1 * | 9/2012 | Kawasaki | G01G 19/086 |
| | | | 701/1 |
| 2019/0195679 A1 * | 6/2019 | Maeda | B60T 8/172 |

FOREIGN PATENT DOCUMENTS

| | | |
|---|---|---|
| EP | 0 968 892 A1 | 1/2000 |
| JP | 3362522 B2 | 1/2003 |
| JP | 5346659 B2 | 11/2013 |
| JP | 2019-113373 A | 7/2019 |
| JP | 2019-194747 A | 11/2019 |
| KR | 101735729 B1 * | 5/2017 ............ B60W 40/12 |

OTHER PUBLICATIONS

Extended European Search Report for European Application No. 23188611.0, dated Feb. 1, 2024.

* cited by examiner

*Primary Examiner* — Natalie Huls
(74) *Attorney, Agent, or Firm* — Birch, Stewart, Kolasch & Birch, LLP

(57) ABSTRACT

A wheel load estimation device includes a wheel speed acquisition unit, a frequency characteristic ratio calculation unit, a load ratio calculation unit, and a wheel load calculation unit. The wheel speed acquisition unit acquires wheel speed information of each wheel included in the vehicle. The frequency characteristic ratio calculation unit calculates a front-to-rear frequency characteristic ratio and a left-to-right frequency characteristic ratio. The load ratio calculation unit calculates the front-to-rear load ratio and the left-to-right load ratio. The wheel load calculation unit calculates, a wheel load ratio representing a relative wheel load among the wheels included in the vehicle, for at least one of the wheels of the vehicle. The load ratio calculation unit calculates the front-to-rear load ratio by taking a linear combination of the calculated two or more front-to-rear gain ratios using weights that are different from one another.

9 Claims, 8 Drawing Sheets

WHEEL LOAD ESTIMATION DEVICE, METHOD, AND PROGRAM

CROSS REFERENCE TO RELATED APPLICATIONS

This application claims priority to Japanese Patent Application No. 2022-132044 filed on Aug. 22, 2022, the entire contents of which are incorporated herein by reference.

FIELD OF INVENTION

The present invention relates to a wheel load estimation device, method, and program for estimating a wheel load of a wheel included in a vehicle.

BACKGROUND

Various control systems are installed on a vehicle so that the vehicle can travel appropriately. Such control systems sometimes use the wheel loads of the respective wheels as their control parameters. Therefore, there are some demands for highly accurate wheel load estimations. For example, some automatic brake control systems distribute appropriate braking force according to the wheel loads of the respective wheels.

JP 2019-113373A discloses a technique for estimating the wheel loads of the respective wheels based on the wheel speed information of the respective wheels. According to JP 2019-113373A, when the wheel load of a rotating wheel changes, the gain in the frequency spectrum of the acceleration of the wheel changes accordingly. Under the same loading condition, the gain integrals of the two front wheels exhibits a substantially linear relationship with respect to the gain integrals of the two rear wheels, and a ratio between these gain integrals (front-to-rear frequency characteristic ratio) remains substantially constant. The wheel load is, at the same time, dependent on the front-to-rear frequency characteristic ratio. The same relationships hold for the left and right wheels of the vehicle. JP 2019-113373A therefore uses these relationships to calculate the front-to-rear load ratio based on the ratio of the gain integrals of the frequency spectra of the front wheels and of the rear wheels, and to calculate the left-to-right load ratio based on the ratio between the gain integrals of the frequency spectra of the left wheels and of the right wheels.

SUMMARY OF INVENTION

However, according to the inventors of the present invention, the gain in the frequency spectrum of the acceleration of a wheel does not exhibit a uniform change with respect to a change in the wheel load across the entire frequency band. In other words, depending on the frequency band, a change in the gain of the frequency spectrum with respect to a change in the wheel load may be relatively small, or may be in the opposite direction to that of a change in another frequency band. This lack of uniformity is not taken into consideration in JP 2019-113373A, and therefore, there is still some room for an improvement in the accuracy of the wheel load estimations.

An object of the present invention is to provide a wheel load estimation device, method, and program capable of accurately estimating a wheel load with simple equipment.

A wheel load estimation device according to a first aspect of the present invention is a wheel load estimation device that estimates a wheel load of a vehicle, and includes a wheel speed acquisition unit, a frequency characteristic ratio calculation unit, a load ratio calculation unit, and a wheel load calculation unit. The wheel speed acquisition unit acquires wheel speed information of each wheel included in the vehicle, from a wheel speed sensor mounted on the vehicle. The frequency characteristic ratio calculation unit calculates, based on the wheel speed information, a front-to-rear frequency characteristic ratio that changes with a change in a front-to-rear load ratio that is a ratio between a load exerted on a front wheel of the vehicle and a load exerted on a rear wheel of the vehicle, and a left-to-right frequency characteristic ratio that changes with a change in a left-to-right load ratio that is a ratio between a load exerted on a left wheel of the vehicle and a load exerted on a right wheel of the vehicle; The load ratio calculation unit calculates the front-to-rear load ratio and the left-to-right load ratio based on the front-to-rear frequency characteristic ratio and the left-to-right frequency characteristic ratio, respectively. The wheel load calculation unit calculates, a wheel load ratio representing a relative wheel load among the wheels included in the vehicle, for at least one of the wheels of the vehicle, based on the front-to-rear load ratio and the left-to-right load ratio. The frequency characteristic ratio calculation unit calculates, as the front-to-rear frequency characteristic ratio, a front-to-rear gain ratio that is a ratio of a gain in a frequency spectrum of acceleration of a front wheel with respect to a gain in a frequency spectrum of acceleration of a rear wheel at two or more specific frequencies, and calculates, as the left-to-right frequency characteristic ratio, a left-to-right gain ratio that is a ratio of the gain in a frequency spectrum of acceleration of a left wheel to the gain in a frequency spectrum of acceleration of a right wheel at two or more specific frequencies. The load ratio calculation unit calculates the front-to-rear load ratio by taking a linear combination of the calculated two or more front-to-rear gain ratios using weights that are different from one another, and calculates the left-to-right load ratio by taking a linear combination of the calculated two or more left-to-right gain ratios with weights that are different from one another.

A wheel load estimation device according to a second aspect of the present invention is the wheel load estimation device according to the first aspect, further including a total weight calculation unit that calculates a total weight of the vehicle that is travelling, wherein the wheel load calculation unit calculates the wheel load based on the identified total weight of the vehicle and the wheel load ratio.

A wheel load estimation device according to a third aspect of the present invention is the wheel load estimation device according to the first or second aspect, wherein the wheel load calculation unit calculates the wheel load ratio for each of the wheels included in the vehicle.

A wheel load estimation device according to a fourth aspect of the present invention is the wheel load estimation device according to any one of the first to third aspects, wherein the frequency characteristic calculation unit calculates the front-to-rear gain ratio in two or more specific frequency bands, and calculates the left-to-right gain ratio in two or more specific frequency bands.

A wheel load estimation method according to a fifth aspect of the present invention is a wheel load estimation method for estimating a wheel load of a vehicle, wheel load estimation method being executed by one or more computers, and including steps described below. A wheel load estimation program according to a sixth aspect of the present invention is a wheel load estimation program for estimating a wheel load of a vehicle, the wheel load estimation program causing one or more computers to execute steps described below:

(1) a step of acquiring wheel speed information of each wheel included in the vehicle, from a wheel speed sensor mounted on the vehicle;

(2) a step of calculating, based on the wheel speed information, a front-to-rear frequency characteristic ratio that changes with a change in a front-to-rear load ratio that is a ratio between a load exerted on a front wheel of the vehicle and a load exerted on a rear wheel of the vehicle;

(3) a step of calculating, based on the wheel speed information, a left-to-right frequency characteristic ratio that changes with a change in a left-to-right load ratio that is a ratio between a load exerted on a left wheel of the vehicle and a load exerted on a right wheel of the vehicle;

(4) a step of calculating the front-to-rear load ratio and the left-to-right load ratio based on the front-to-rear frequency characteristic ratio and the left-to-right frequency characteristic ratio, respectively; and (5) a step of calculating a wheel load ratio representing a relative wheel load among the wheels included in the vehicle, for at least one of the wheels of the vehicle, based on the front-to-rear load ratio and the left-to-right load ratio.

Note that (2) the step of calculating the front-to-rear frequency characteristic ratio is a step of calculating a front-to-rear gain ratio that is a ratio of a gain in a frequency spectrum of acceleration of a front wheel with respect to a gain in a frequency spectrum of acceleration of a rear wheel at two or more specific frequencies, (3) the step of calculating the left-to-right frequency characteristic ratio is a step of calculating a left-to-right gain ratio that is a ratio of the gain in a frequency spectrum of acceleration of a left wheel to the gain in a frequency spectrum of acceleration of a right wheel at two or more specific frequencies, and (4) the step of calculating the front-to-rear load ratio and the left-to-right load ratio is a step of calculating the front-to-rear load ratio by taking a linear combination of the calculated two or more front-to-rear gain ratios using weights that are different from one another, and calculating the left-to-right load ratio by taking a linear combination of the calculated two or more left-to-right gain ratios with weights that are different from one another.

According to the present invention, it is possible to estimate the wheel load accurately with simple equipment.

DETAILED DESCRIPTION OF THE PREFERRED EMBODIMENTS

A wheel load estimation device, method, and program according to an embodiment of the present invention will now be explained with reference to some drawings.

1. Configuration of Wheel Load Estimation Device

Figure 1:
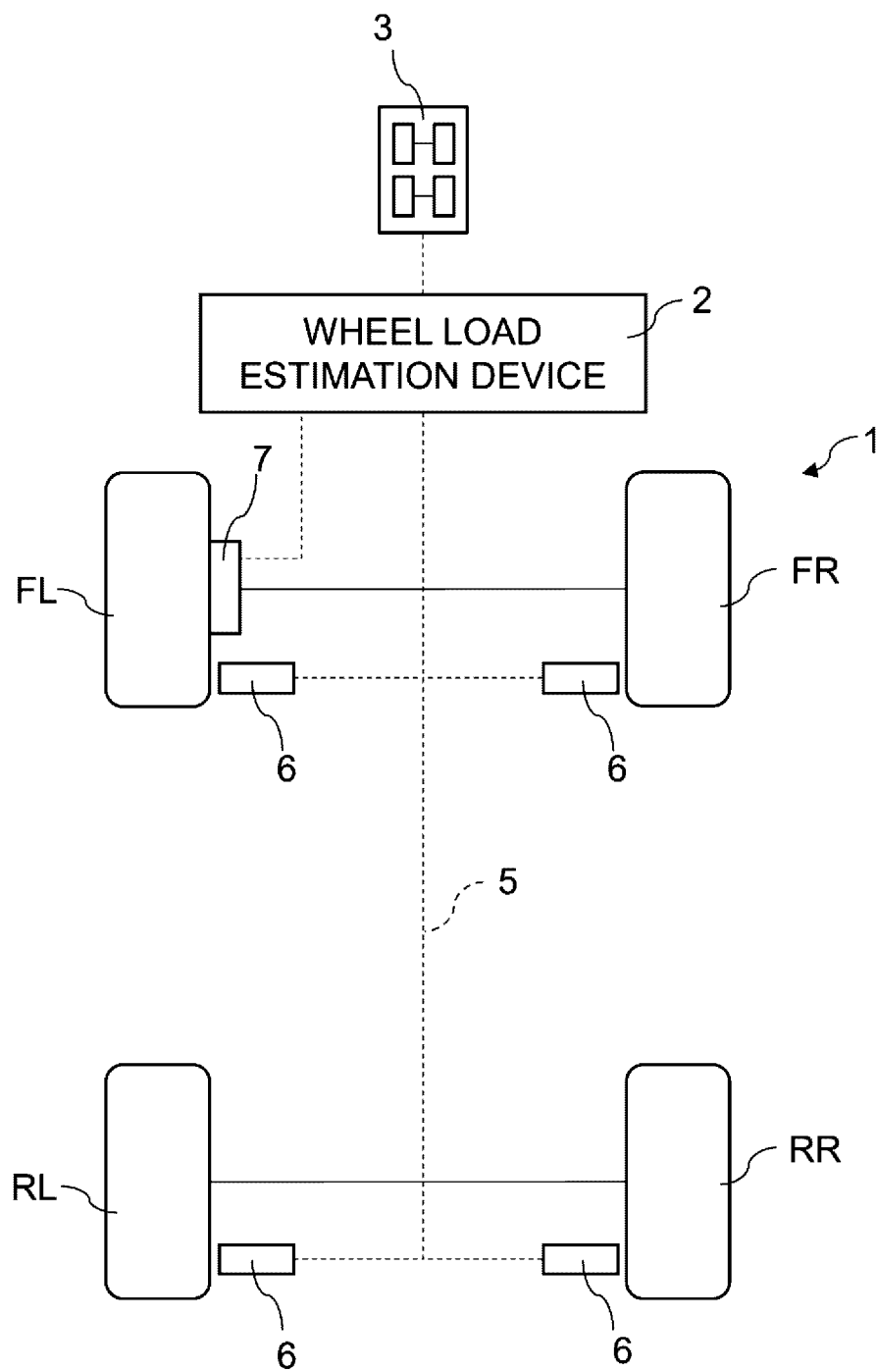
FIG. 1 is a schematic diagram showing how a wheel load estimation device according to an embodiment of the present invention is installed on a vehicle.

FIG. 1 is a schematic diagram showing how a wheel load estimation device 2 according to the present embodiment is installed on a vehicle 1. The vehicle 1 is a four-wheeled vehicle, and includes a front left wheel FL, a front right wheel FR, a rear left wheel RL, and a rear right wheel RR. The wheel load estimation device 2 has a function of estimating the wheel loads exerted on the respective wheels FL, FR, RL, and RR. Such wheel load estimation data is used in various types of control for assisting driving of the vehicle 1. For example, the wheel load estimation data is transmitted to a brake control system and used in controlling braking. The wheel load estimation data is also transmitted to a tire pressure monitoring systems (TPMS) mounted on the wheels FL, FR, RL, RR, for example, and is used in determining a drop in the tire pressure. When a drop in the tire pressure is detected based on the wheel load estimation data, the TPMS can issue a warning via a warning indicator 3 that is mounted on the vehicle 1. There are also some TPMSs that determine a drop in the pressure of a tire using an approach that is based on a change in the dynamic loaded radius of the tire, but the dynamic loaded radius of the tire is not only affected by a drop in the tire pressure but also by the wheel load. Therefore, by using the wheel load estimation data to cancel out the effect of the wheel load from the dynamic loaded radius of the tire, the TPMS adopting such an approach can determine a drop in the tire pressure at a higher accuracy. The wheel load estimation data may also be used in detecting overloading or imbalanced loading of the vehicle 1, and, upon detecting overloading or imbalanced loading, the warning indicator 3 mounted on the vehicle 1 may be caused to issue a warning. Overloading is a condition in which a load exceeding the load capacity is loaded on the vehicle 1, and imbalanced loading is a condition in which the load of the vehicle 1 is locally imbalanced.

In the present embodiment, the wheel loads exerted on the respective wheels FL, FR, RL, and RR are estimated based on the wheel speeds (rotation speeds) of the respective wheels FL, FR, RL, and RR. Each of the wheels FL, FR, RL, and RR is equipped with a wheel speed sensor 6, and the wheel speed sensor 6 detects information indicating a wheel speed of the wheel on which the sensor 6 is mounted (hereinafter, referred to as wheel speed information), at a predetermined sampling cycle ΔT. The wheel speed sensor 6 is connected to the wheel load estimation device 2 via a communication line 5, and the wheel speed information detected by the wheel speed sensor 6 is transmitted to the wheel load estimation device 2 in real time.

Any sensor may be used as the wheel speed sensor 6, as long as the sensor is capable of detecting the wheel speed of corresponding one of the running wheels FL, FR, RL, and RR. Examples of types of sensors that may be used include a sensor that measures the wheel speed from an output signal from an electromagnetic pickup, and a sensor that generates power using the rotation, as a dynamo does, and measures the wheel speed from the resultant voltage. The position where the wheel speed sensor 6 is mounted is also not limited to a particular position, as long as the wheel speed can be detected, and may be selected as appropriate, in the manner suitable for the type of sensor.

In the present embodiment, a wheel torque sensor (hereinafter, referred to as a WT sensor) 7 is provided on the front left wheel that is one driving wheel. The WT sensor 7 detects wheel torque of the vehicle 1. The WT sensor 7 is connected to the wheel load estimation device 2 via the communication line 5, and information of the wheel torque detected by the WT sensor 7 is transmitted to the wheel load estimation device 2 in real time.

The structure and the mounting position of the WT sensor 7 are not limited to a particular structure and position as long as the WT sensor 7 can detect the wheel torque of the driving wheel of the vehicle 1. As the WT sensor, because there are various types of WT sensors that are commercially available, and the configurations thereof are well-known, detailed description thereof is omitted herein. The wheel torque can also be detected without using the WT sensor 7. For example, the wheel torque may be estimated from an engine torque, which can be obtained from an engine control device.

Figure 2:
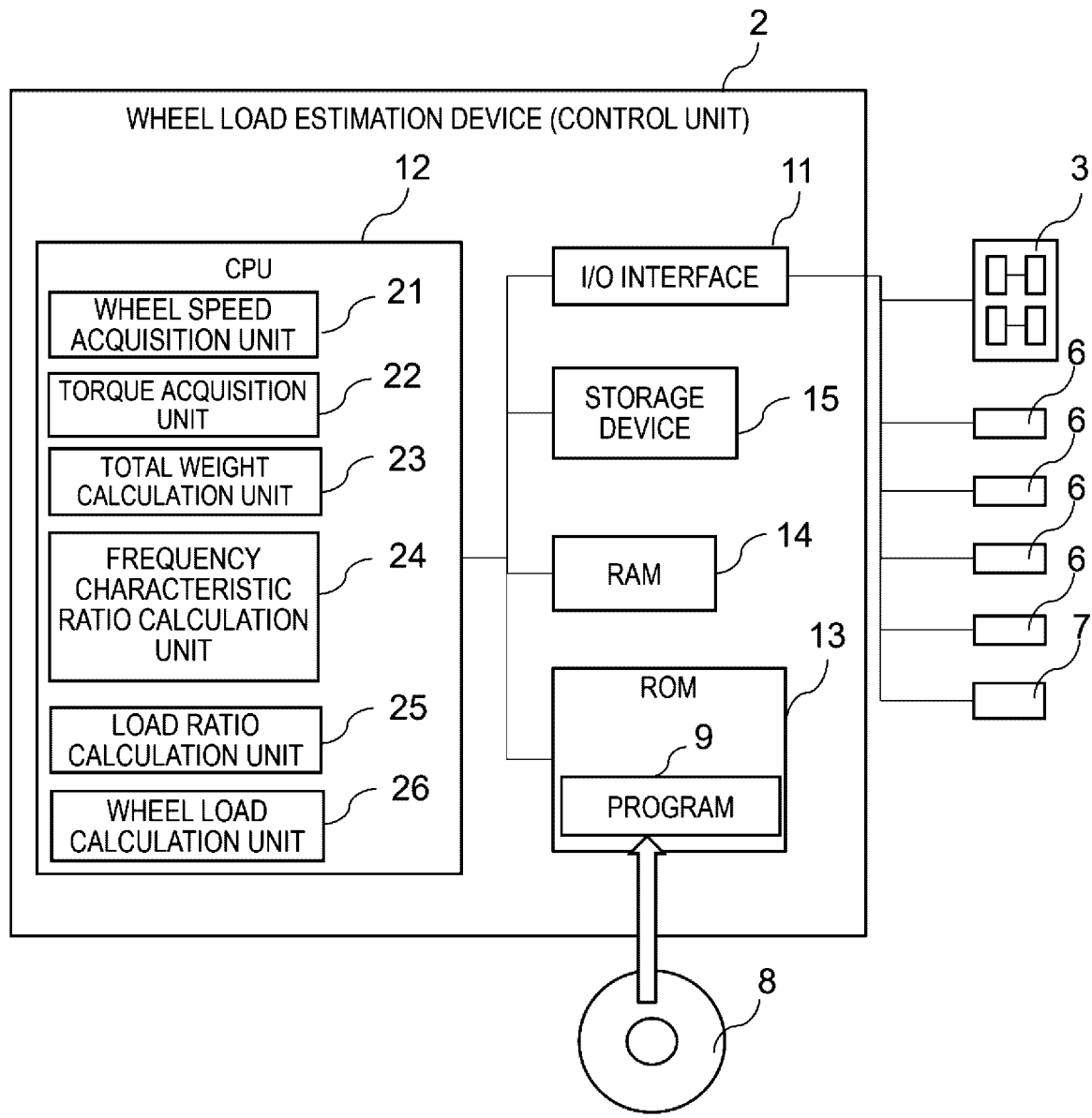
FIG. 2 is a block diagram of an electrical configuration of the wheel load estimation device.

FIG. 2 is a block diagram showing an electrical configuration of the wheel load estimation device 2. As shown in FIG. 2, the wheel load estimation device 2 is a control unit (in-vehicle computer) installed on the vehicle 1, and includes an I/O interface 11, a CPU 12, a ROM 13, a RAM 14, and a rewritable nonvolatile storage device 15. The I/O interface 11 is a communication device for establishing communication with external devices such as the wheel speed sensor 6, the warning indicator 3, and the WT sensor 7. The ROM 13 stores therein a program 9 for controlling the operation of the parts of the vehicle 1. The program 9 is loaded from the storage medium 8 such as a CD-ROM onto the ROM 13. The CPU 12 reads and executes the program 9 from the ROM 13 to virtually operate as a wheel speed acquisition unit 21, a torque acquisition unit 22, a total weight calculation unit 23, a frequency characteristic ratio calculation unit 24, a load ratio calculation unit 25, and a wheel load calculation unit 26. Operations of these units 21 to 26 will be described later in detail. The storage device 15 is implemented as a hard disk or a flash memory, for example. The location in which the program 9 is stored may also be the storage device 15, instead of the ROM 13. The RAM 14 and the storage device 15 are used in operations of the CPU 12, as appropriate.

The warning indicator 3 may be implemented in any form, as long as the indicator is capable of notifying the user of a drop in the tire pressure, overloading, imbalanced loading, or the like. Examples of the warning indicator 3 include a liquid crystal display element and a liquid crystal monitor. The position where the warning indicator 3 is mounted may also be selected as appropriate, and preferably, provided at a position easily recognizable by a driver, such as on an instrument panel. When the control unit (wheel load estimation device 2) is connected to a car navigation, a monitor of the car navigation system may be used as the warning indicator 3. When a monitor is used as the warning indicator 3, the warning may also be an icon or character information displayed on the monitor.

2. Principle of Wheel Load Estimation

A principle of the wheel load estimation process for estimating the wheel loads of the respective wheels FL, FR, RL, and RR will now be described with reference to some of the drawings. This process estimates the wheel load of a rotating wheel using an algorithm that is based on the frequency characteristics of the wheel. To explain more specifically, the frequency characteristics of a rotating wheel change, as the load exerted on the wheel that is the wheel load changes. When the wheel load of a wheel increases, the area in contact with the road surface also increases, and the tire mounted on the wheel receives greater force from the road surface. An increase in the wheel load also results in an increase in the elastic energy of the tire sidewall serving as a spring. When the wheel load of the wheel decreases, by contrast, the area in contact with the road surface also decreases, and the force the tire receives from the road surface also decreases. A decrease in the wheel load also results in a decrease in the elastic energy of the tire sidewall serving as a spring. Changes in the wheel load are accompanied by these phenomena, and the frequency characteristics of the wheel also change accordingly.

Figure 3A:
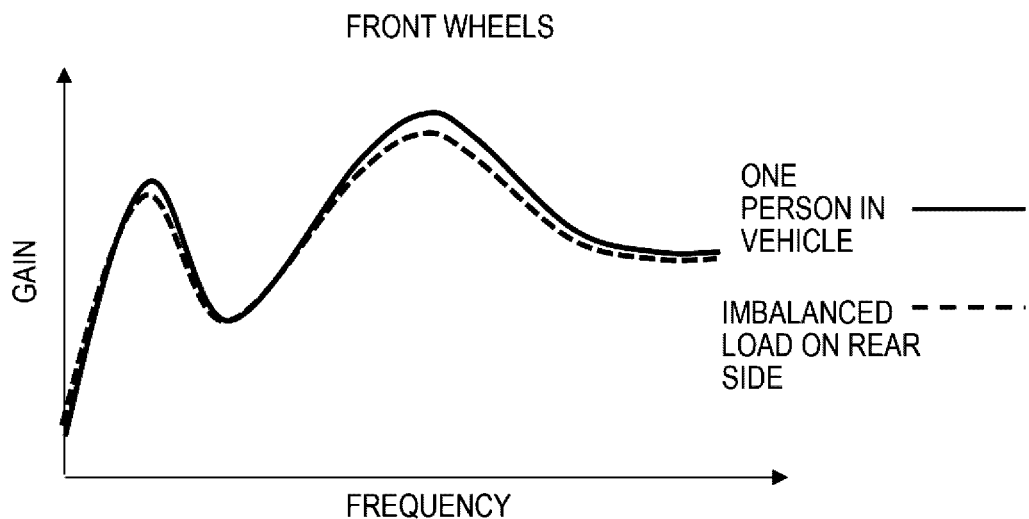
FIG. 3A is a graph of a frequency spectrum of the acceleration of the front wheel under two load conditions.
Figure 3B:
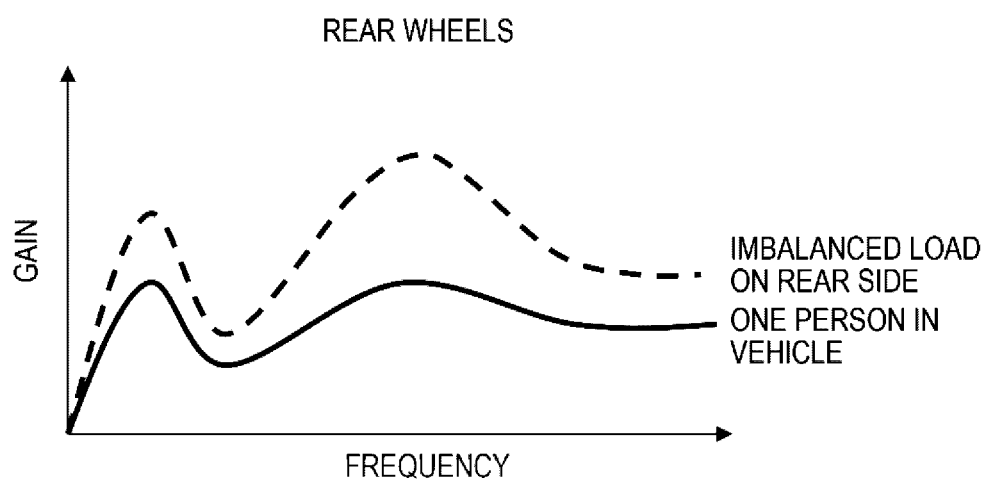
FIG. 3B is a graph of a frequency spectrum of the acceleration of the rear wheel under the two load conditions.

FIG. 3A includes graphs of the spectra of frequencies of the accelerations (rotational accelerations) of a front wheel, and shows a gain when there is one driver on the vehicle 1 (one passenger) and a gain when there is an imbalanced load on the rear side (imbalanced load on the rear side) of the vehicle 1, in addition to one driver. FIG. 3B is a graph of acceleration (rotational acceleration) frequency spectra corresponding to the rear wheel, and shows a gain when there is one passenger, and a gain when there is imbalanced load on the rear side. As shown in these drawings, when the wheel load changes, the magnitude of the gain changes, accordingly. This example is, however, of a front-engine vehicle, so the gain of the front wheel is not significantly affected by the condition of the imbalanced load on the rear side.

These graphs show a general tendency that a higher wheel load on a wheel results in a wider frequency spectrum, and a lower wheel load on a wheel results in a smaller frequency spectrum. However, as a result of intensive studies, the inventors of the present invention have found out that the above tendency can vary among the frequency bands. In other words, there are some cases in which the frequency spectrum and the gain do not change uniformly across the entire frequency band, under a loading condition 1 in which a certain wheel has a high wheel load, and a loading condition 2 in which the same wheel has a low wheel load.

Figure 4:
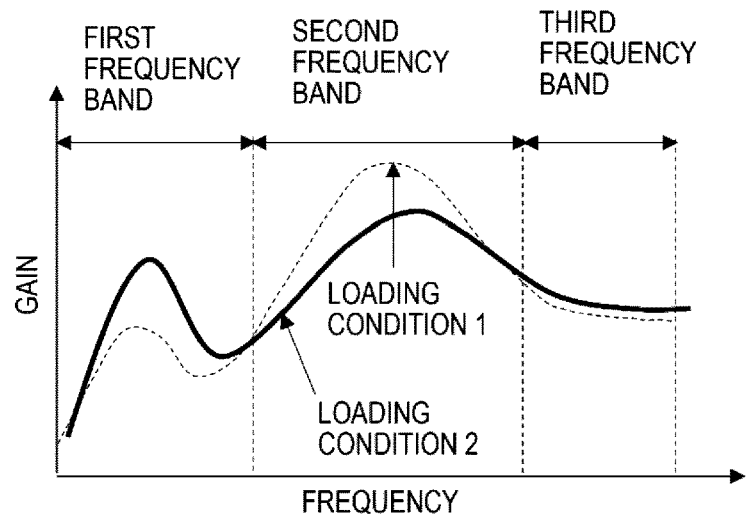
FIG. 4 is an example of a graph of a frequency spectrum of the acceleration under the two load conditions.

FIG. 4 is a diagram for explaining this point. In the example shown in FIG. 4, the gain under the loading condition 2 is higher in a first frequency band, and the gain under the loading condition 1 is higher in a second frequency band. In the third frequency band, the gain is less affected by the loading condition. In this manner, in reality, changes in the wheel load are sometimes not reflected to the changes in the gain integral, which is obtained by integrating the gains across the entire frequency bands of the frequency spectrum.

Figure 5A:
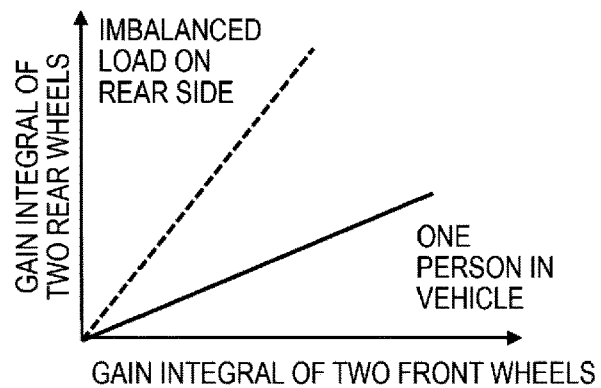
FIG. 5A is a graph showing approximate relationships between a gain integral of the two front wheels and a gain integral of the two rear wheels under two load conditions.
Figure 5B:
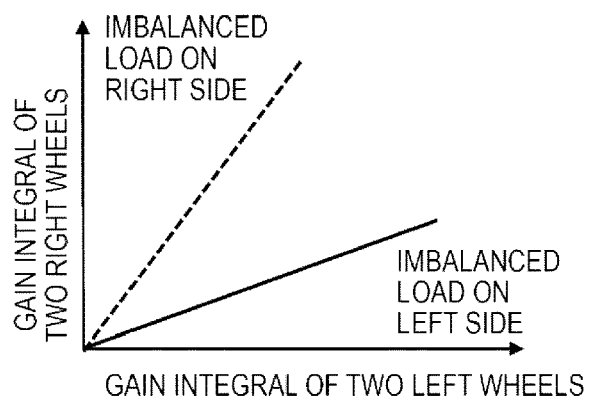
FIG. 5B is a graph showing approximate relationships between a gain integral of the two left wheels and a gain integral of the two right wheels under two load conditions.
Figure 6:
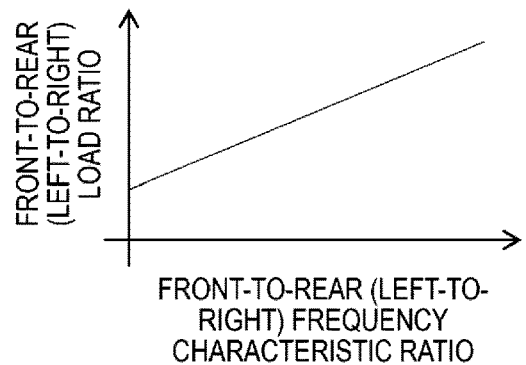
FIG. 6 is a graph showing approximate relationships between a front-to-rear (left-to-right) frequency characteristic ratio and a front-to-rear (left-to-right) load ratio.

Therefore, with the wheel load ratio estimation method that uses an approximate linear relationship (see FIG. 5A) assumed between the gain integral of the two front wheels and the gain integral of the two rear wheels under the same loading condition, and an approximate linear relationship (see FIG. 6) assumed between the ratio of these gain integrals and the front-to-rear load ratio (that is a ratio between the sum of the wheel loads of the two front wheels and the sum of the wheel loads of the two rear wheels in the present embodiment), the resultant wheel load estimation may lack some precision. The same relationship holds in the wheel load ratio estimation that uses an approximate linear relationship assumed between the gain integral of the two left wheels and the gain integral of the two right wheels under the same loading condition (see FIG. 5B), and an approximate linear relationship assumed between a ratio of these gain integrals and a left-to-right load ratio (that is a ratio between the sum of the wheel loads of the two left wheels and the sum of the wheel loads of the two right wheels, in the present embodiment). According to the study of the inventors of the present invention, a wheel speed and a road surface on which the vehicle 1 travels, even with the same tires, are also the factors that affect how the frequency spectrum changes as the wheel load changes.

Figure 7A:
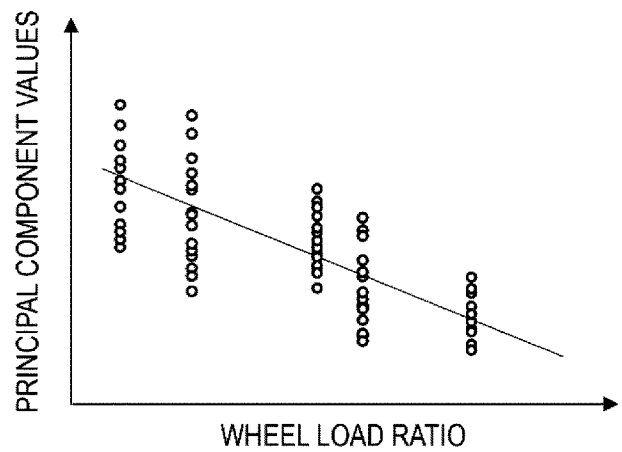
FIG. 7A is a diagram for explaining a concept of principal component analysis.

In order to address this issue, the inventors have identified the acceleration frequency band where a frequency spectrum changes as the wheel load changes particularly prominently (that is, a frequency band that is more suitable for a wheel load estimation), based on a large number of pieces of wheel speed data collected by driving a vehicle the wheel loads of which are known, on various types of road surfaces. More specifically, to begin with, based on the wheel speed information collected from the wheel speed sensors 6 that are mounted on the respective wheels of the vehicle 1, fast Fourier transform (FFT) was performed on the wheel speed information corresponding to a predetermined time length (30 seconds), at every interval of 10 seconds, to obtain the frequency spectrum of the acceleration. A gain was then calculated every 0.2 Hz of the frequency spectrum corresponding to each of the wheels. Based on these gains, a front-to-rear gain ratio and two kinds of left-to-right gain ratios were calculated at an increment of the 0.2 Hz spectrum. The front-to-rear gain ratio herein is a ratio between the gain of the two front wheels and the gain of the two rear wheels. One of the left-to-right gain ratios herein is a ratio between the gain of the FL wheel and the gain of the FR wheel, and the other is a ratio between the gain of the RL wheel and the gain of the RR wheel (hereinafter, sometimes referred to as a first left-to-right gain ratio and a second left-to-right gain ratio, respectively) (see FIG. 7A).

Figure 7B:
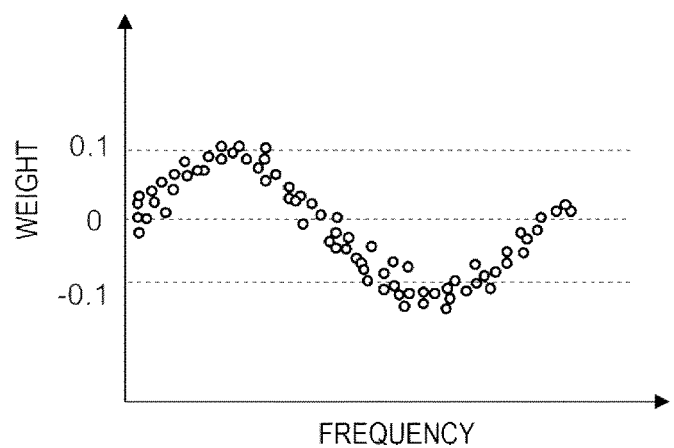
FIG. 7B is a diagram showing an example of a gain at each frequency and a weighting coefficient corresponding thereto.

A main component analysis was then executed on each of the front-to-rear gain ratio, the first left-to-right gain ratio, and the second left-to-right gain ratio, and two frequency bands were identified for each of the front-to-rear gain ratio, the first left-to-right gain ratio, and the second left-to-right gain ratio. Such frequency bands are those identified as exhibiting higher correlations with corresponding one of the front-to-rear load ratio, the first left-to-right load ratio that is a ratio between the loads on the FL wheel and the FR wheel, and the second left-to-right load ratio that is a ratio between the loads on the RL, wheel and the RR wheel (see FIG. 7B). In other words, for the front-to-rear gain ratio at each frequency of an increment of 0.2 Hz, two frequency bands F1 and F2 that include the frequencies where the weight of the front-to-rear gain ratio, which is the main component, exhibits the largest absolute values. In the same manner, for the first left-to-right gain ratio at each frequency in an increment of 0.2 Hz, frequency bands F3 and F4 including the frequencies at which the absolute values of the weight of the first left-to-right gain ratio, which is a main component, are at their peak were identified; and, for the second left-to-right gain ratio at each frequency in an increment of 0.2 Hz, frequency bands F5 and F6 including the frequencies at which the absolute values of the weight of the second left-to-right gain ratio, which is a main component, are at their peak were identified. As a result, at least two frequency bands corresponding to the first frequency band and the second frequency band, respectively, in FIG. 4 are identified for each of the front-to-rear gain ratio, the first left-to-right gain ratio, and the second left-to-right gain ratio.

A ratio between the gain integral of the two front wheels and the gain integral of the two rear wheels in the frequency band F1 is defined as a front-to-rear gain ratio R1, and a ratio between the gain integral of the two front wheels and the gain integral of the two rear wheels in the frequency band F2 is defined as a front-to-rear gain ratio R2 (hereinafter, the front-to-rear gain ratios R1 and R2 are sometimes collectively referred to as a front-to-rear frequency characteristic ratio). By running multiple regression analysis on a large number of data sets of a front-to-rear frequency characteristic ratio and a front-to-rear load ratio L1, using the front-to-rear load ratio L1 as an objective variable and the front-to-rear gain ratios R1 and R2 as explanatory variables, weighting coefficients a and b for the front-to-rear gain ratios R1 and R2 optimized for wheel load estimations are identified. That is to say, as will be described below, it is possible to represent the front-to-rear load ratio L1 as a linear combination of the front-to-rear gain ratios R1 and R2 that are weighted differently with respect to each other.

$$L1 = a \cdot R1 + b \cdot R2 \tag{1}$$

Each of the gain integral of the two front wheels and the gain integral of the two rear wheels may be an average or a sum of integrals obtained by integrating the gains of the accelerations of the two front wheels and the two rear wheels, respectively, in a predetermined frequency band, an integral obtained by integrating the gains of the accelerations of the average wheel speeds of the two front wheels and of the two rear wheels in a predetermined frequency band, or an integral obtained by integrating the gains of the differences in the wheel speeds of the two front wheels and the differences in the wheel speeds of the two rear wheels in a predetermined frequency band, respectively.

Similarly, a ratio between the gain integral of the FL wheel and the gain integral of the FR wheel in the frequency band F3 is defined as a left-to-right gain ratio R3, and a ratio between the gain integral of the FL wheel and the gain integral of the FR wheel in the frequency band F4 is defined as a left-to-right gain ratio R4. Similarly, the ratio between the gain integral of the RL wheel and the gain integral of the RR wheel in the frequency band F5 is defined as a left-to-right gain ratio R5, and the ratio between the gain integral of the RL wheel and the gain integral of the RR wheel in the frequency band F6 is defined as a left-to-right gain ratio R6 (hereinafter, the left-to-right gain ratios R3, R4, R5, and R6 may be collectively referred to as left-to-right frequency characteristic ratios). By running multiple regression analysis on a large number of data sets of left-to-right frequency characteristic ratios R3 and R4 and a first left-to-right load ratio L2, using the first left-to-right load ratio L2 as an objective variable and the left-to-right gain ratios R3 and R4 as explanatory variables, weighting coefficients c and d of the left-to-right gain ratios R3 and R4 optimized for wheel load estimations are identified. By running multiple regression analysis on a large number of data sets of left-to-right frequency characteristic ratios R5 and R6 and a second left-to-right load ratio L3, using the second left-to-right load ratio L3 as an objective variable and the left-to-right gain ratios R5 and R6 as explanatory variables, weighting coefficients e and f of the left-to-right gain ratios R5 and R6 optimized for wheel load estimations are identified. That is to say, as will be described below, it is possible to represent the first left-to-right load ratio L2 as a linear combination of the left-to-right gain ratios R3 and R4 that are weighted differently with respect to each other, and to represent the second left-to-right load ratio L3 as a linear combination of the left-to-right gain ratios R5 and R6 that are weighted differently with respect to each other.

$$L2 = c \cdot R3 + d \cdot R4 \quad (2)$$

$$L3 = e \cdot R5 + f \cdot R6 \quad (3)$$

With the method described above, it is possible to estimate the front-to-rear load ratio and the left-to-right load ratio using the front-to-rear frequency characteristic ratio and the left-to-right frequency characteristic ratio that change more prominently with changes in the front-to-rear load ratio and the left-to-right load ratio, respectively, and it is also possible to consider a case in which there is a negative correlation with an increase in the wheel load. Note that the frequency bands F1 to F6 identified above may also be frequencies at which the absolute values of the weights of the front-to-rear gain ratio and the left-to-right gain ratio, which are the main components, are at their peak. However, from the viewpoint of stability of wheel load estimations, it is preferable to define F1 to F6 as frequency bands having a predetermined width. Furthermore, in the above example, the relationship between the left-to-right frequency characteristic ratio and the left-to-right gain ratio is identified for each pair of the FL wheel and the FR wheel and of the RL wheel and the RR wheel, but the relationship between the left-to-right frequency characteristic ratio and the left-to-right gain ratio may be identified without distinguishing the left-to-right frequency characteristic ratio and the left-to-right gain ratio on the front side, from the left-to-right frequency characteristic ratio and the left-to-right gain ratio on the rear side. In the example described above, by contrast, the relationship between the front-to-rear frequency characteristic ratio and the front-to-rear gain ratio is identified without distinguishing the front-to-rear frequency characteristic ratios and the front-to-rear gain ratios on the left side and on the right side, but it is also possible to identify the relationship between the front-to-rear frequency characteristic ratio and the front-to-rear gain ratio for each pair of the FL wheel and the RL wheel and of the FR wheel and the RR wheel. It is also possible to identify the relationship between the left-to-right frequency characteristic ratio and the left-to-right gain ratio, and the relationship between the front-to-rear frequency characteristic ratio and the front-to-rear gain ratio, for each pair of FL wheel and the RR wheel and of the FR wheel and RL wheel. An algorithm for the wheel load estimation process based on these findings will be explained below.

When the relationship between the left-to-right frequency characteristic ratio and the left-to-right gain ratio is identified without distinguishing those on the front side and on the rear side, the left-to-right gain ratio is the ratio of the gain integral of the two left wheels with respect to the gain integral of the two right wheels. The gain integral of the two left wheels and the gain integral of the two right wheels may be an average or a sum of integrals obtained by integrating the gains of accelerations of the two left wheels, and an average or a sum of integrals obtained by integrating those of the two right wheels, in a predetermined frequency band, respectively; an integral obtained by integrating gains of accelerations of the average wheel speeds of the two left wheels, and an integral obtained by integrating those of the two right wheels, in a predetermined frequency band, respectively; or an integral obtained by integrating the gains of differences in the wheel speeds of the two left wheels, and an integral obtained by integrating those of the two right wheels, in a predetermined frequency band, respectively.

3. Wheel Load Estimation Process

Figure 8:
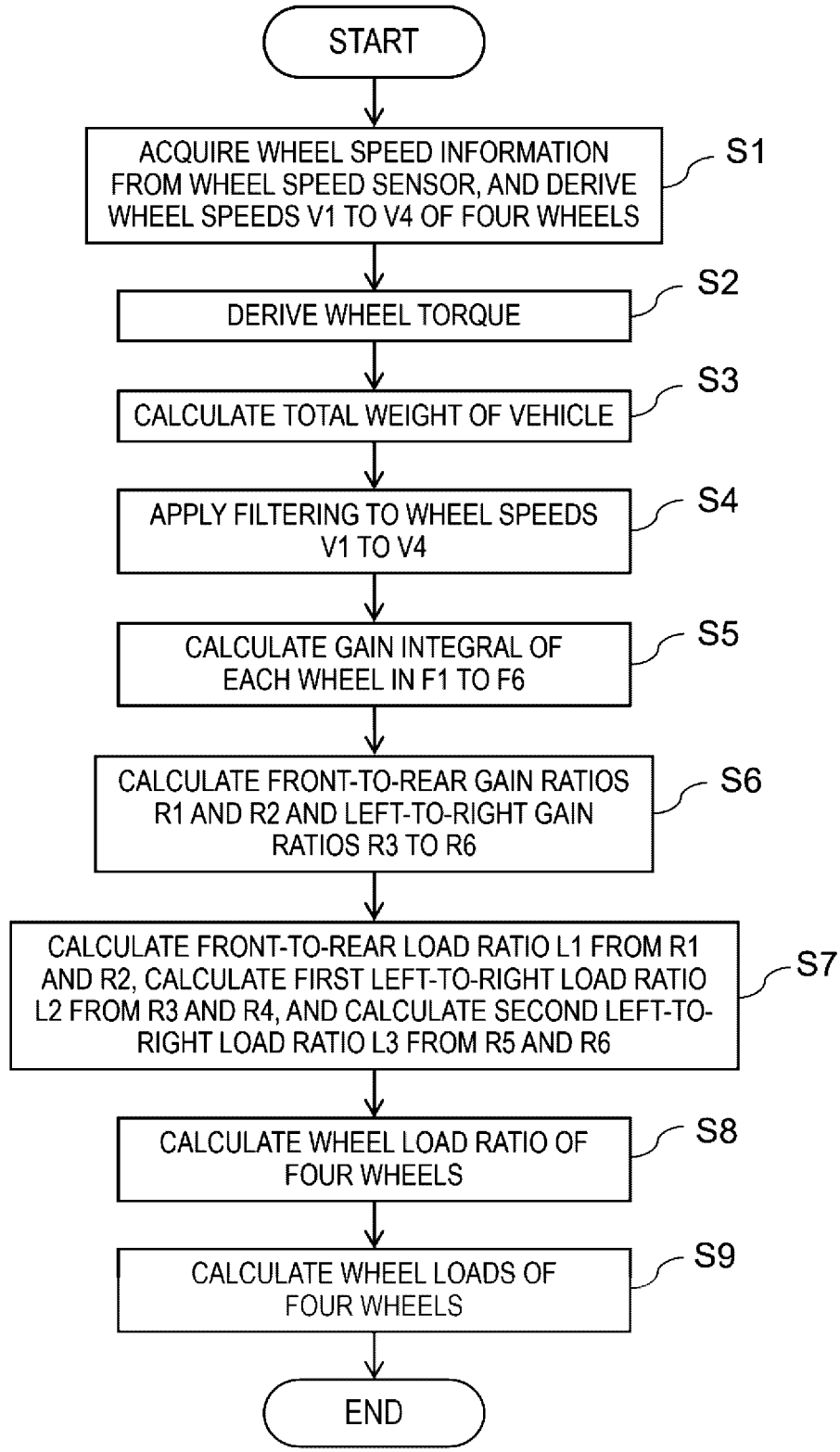
FIG. 8 is a flowchart showing the sequence of a wheel load estimation process.
Figure 9A:
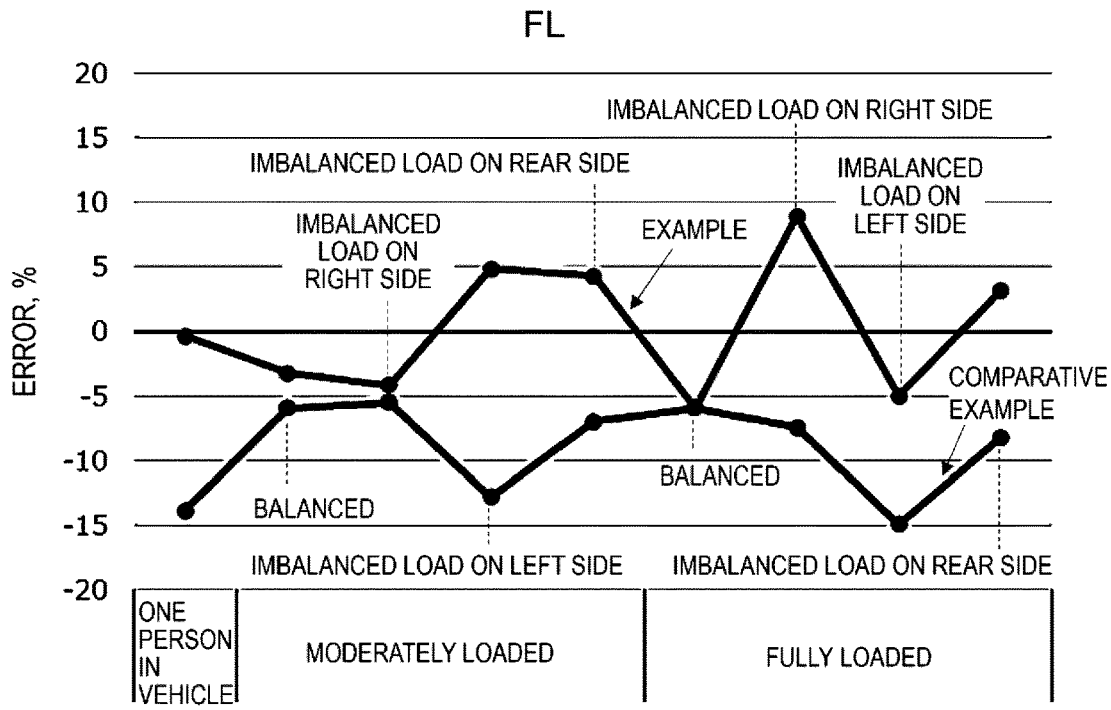
FIG. 9A is a graph showing errors in estimations of the wheel load of the FL wheel, in an example and a comparative example.
Figure 9B:
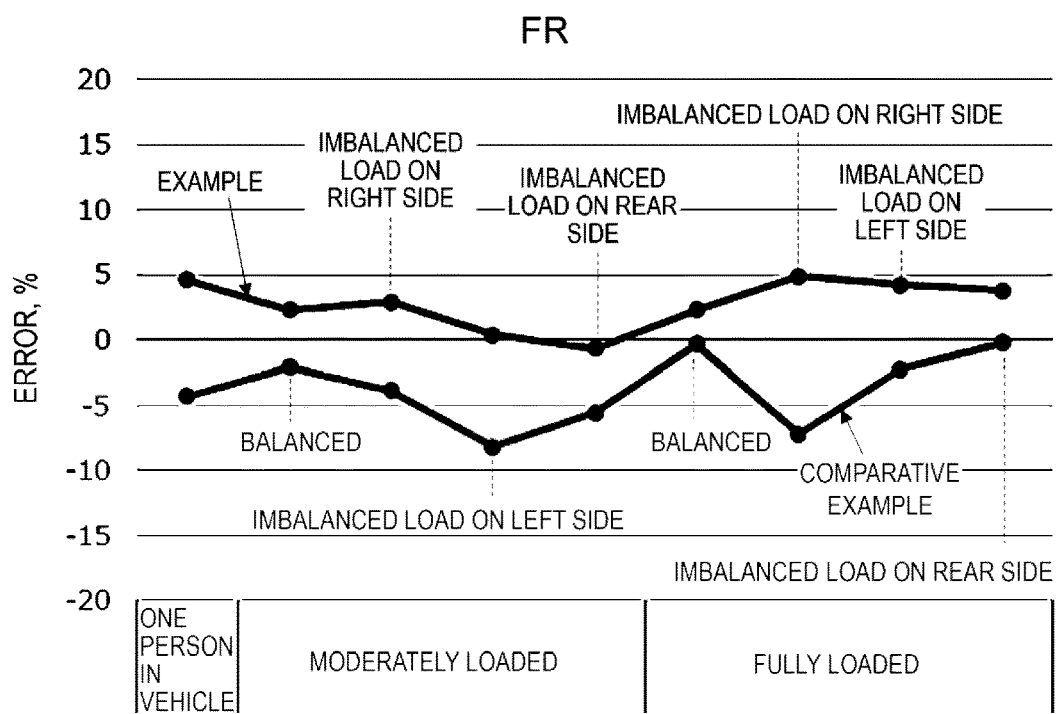
FIG. 9B is a graph showing errors in estimations of the wheel load of the FR wheel, in the example and the comparative example.
Figure 9C:
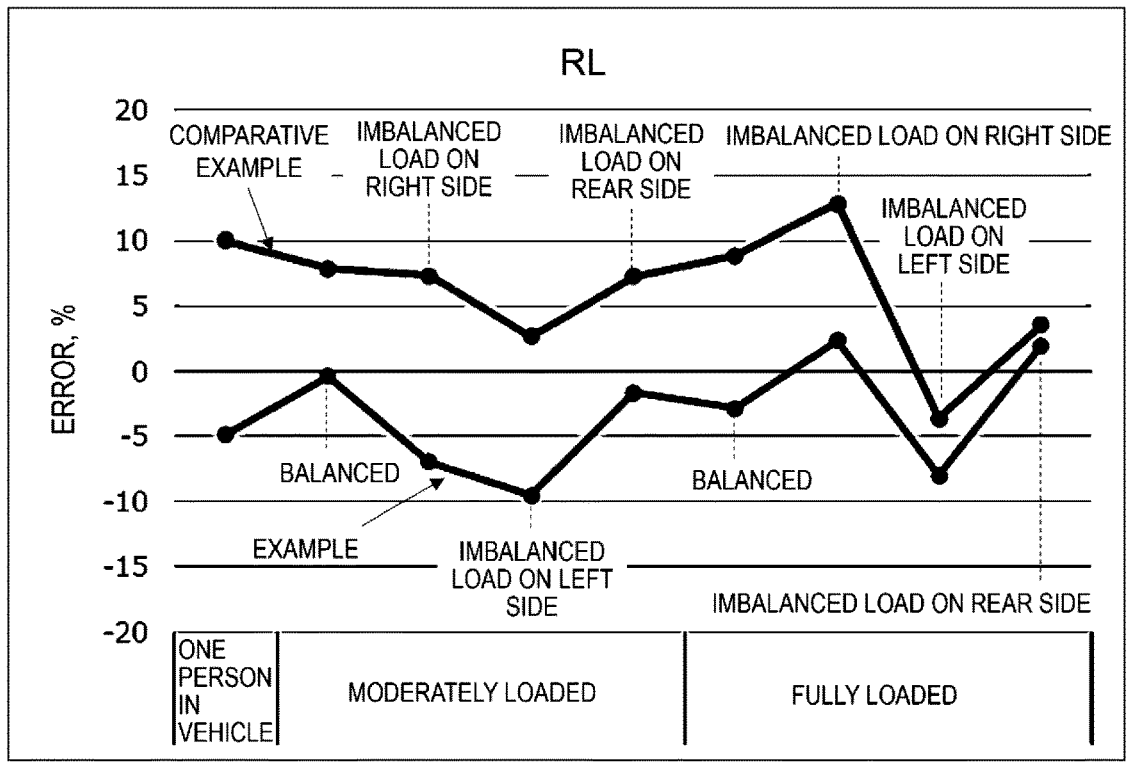
FIG. 9C is a graph showing errors in estimations of the wheel load of the RL wheel, in the example and the comparative example.
Figure 9D:
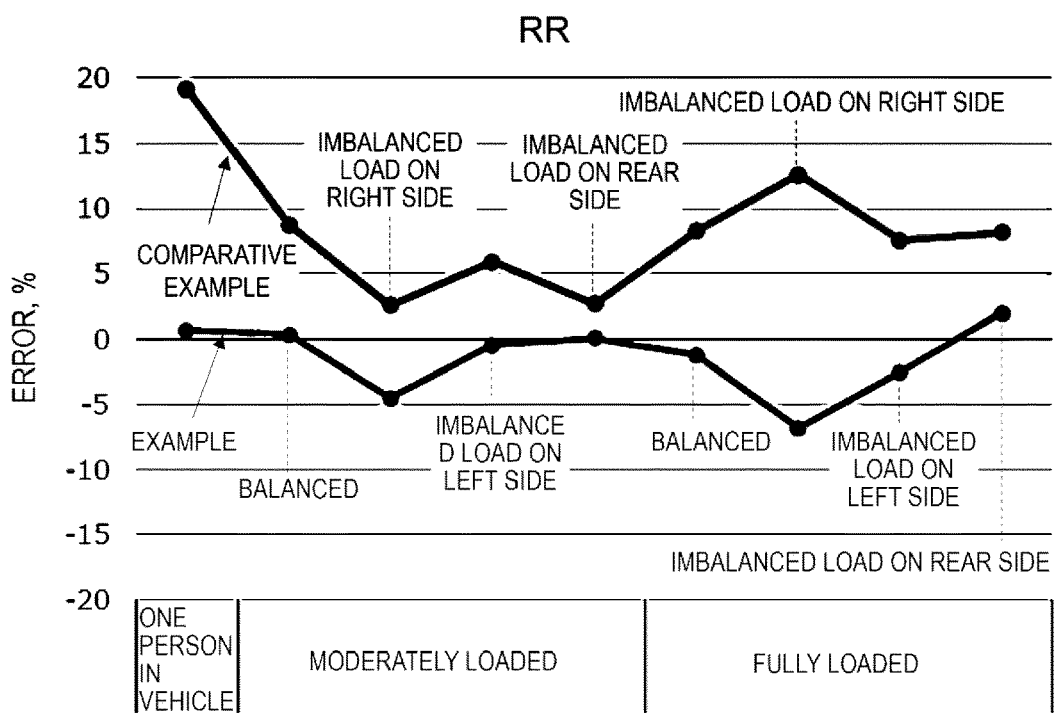
FIG. 9D is a graph showing errors in estimations of the wheel load of the RR wheel, in the example and the comparative example.

FIG. 8 is a flowchart showing the sequence of a wheel load estimation process for estimating the wheel loads of the wheels FL, FR, RL, and RR, respectively. The wheel load estimation process shown in FIG. 8 starts when the vehicle 1 starts travelling, and ends when the vehicle stops travelling, for example. It is assumed herein that the information for identifying the frequency bands F1 to F4 and the weighting coefficients a to d for the following process have already been identified for the vehicle 1 in advance, based on a large number of data sets, and stored in the storage device 15 or the ROM 13. To begin with, the wheel speed acquisition unit 21 acquires wheel speed information from the wheel speed sensors 6 (step S1). The wheel speed acquisition unit 21 stores the acquired wheel speed information temporarily in the RAM 14, or stores the acquired wheel speed information in the storage device 15. The wheel speed acquisition unit 21 also converts the wheel speed information into V1 to V4 that are the wheel speeds of the respective wheels FL, FR, RL, and RR.

The torque acquisition unit 22 then acquires an output signal from the WT sensor 7 (step S2). The torque acquisition unit 22 stores the output signal acquired from the WT sensor 7 temporarily in the RAM 14, or in the storage device 15. The torque acquisition unit 22 also converts the output signal of the WT sensor 7 into a wheel torque.

The total weight calculation unit 23 then calculates a current total weight (weight) M of the vehicle 1 (step S3). In the present embodiment, the total weight M is calculated based on the equation of motion indicated below. In the following equation, WT denotes the wheel torque derived in step S2. $\alpha$ is the acceleration of the vehicle 1, and is calculated from the wheel speeds V1 to V4. g is a gravitational acceleration, and $\theta$ is a road surface grade. $\theta$ may be calculated from data of a position measurement sensor (GPS) mounted on the vehicle 1, for example.

$$WT = M\alpha + Mg \cdot \sin \theta$$

Note that, as to the method of estimating the total weight M of the vehicle 1, there are various known methods, and therefore, further detailed description will be omitted herein. For better understanding, see Japanese Patent No. 5346659 and Japanese Patent No. 4926258 owned by the applicant of the present application, for example.

The frequency characteristic ratio calculation unit 24 then applies filtering on the waveform signals of the wheel speeds V1 to V4 (step S4). Specifically, the frequency characteristic ratio calculation unit 24 applies a filter that passes a predetermined frequency component to each piece of the time-series data of the wheel speeds V1 to V4, to extract the frequency components in the predetermined frequency bands F1 and F2 therefrom. In the same manner, the frequency characteristic ratio calculation unit 24 applies a filter that passes a predetermined frequency component to each piece of the time-series data of the wheel speeds V1 to V4, to extract the frequency components in the predetermined frequency bands F3 to F6 therefrom. This filtering process may be performed on the time-series data of the accelerations A1 to A4 calculated by time-differentiating the time-series data of the wheel speeds V1 to V4. A1 to A4 are rotational accelerations of the wheels FL, FR, RL, and RR, respectively.

The frequency characteristic ratio calculation unit 24 then performs frequency analysis on pieces of time-series data of the frequency bands F1 to F6 extracted in step S4, and calculates gain integrals in the frequency bands F1 to F6, respectively (step S5). To begin with, the frequency characteristic ratio calculation unit 24 derives gains for the frequency bands F1 to F6, respectively, by applying the Parseval's theorem to each piece of time-series data resultant of filtering in step S4. The gains may also be derived by applying fast Fourier transform on the time-series data of the wheel speeds V1 to V4 resultant of skipping step S4, using time-series estimation that uses an autoregressive model, or based on dispersion of the time-series data, for example. The frequency characteristic ratio calculation unit 24 then calculates the gain integral in the frequency band F1 for the two front wheels; the gain integral in the frequency band F1 for the two rear wheels; the gain integral in the frequency band F2 for the two front wheels; and the gain integral in the frequency band F2 for the two rear wheels. The frequency characteristic ratio calculation unit 24 also calculates the gain integral for the FL wheel and the gain integral for the FR wheel in the frequency band F3; the gain integral for the FL wheel and the gain integral for the FR wheel in the frequency band F4; the gain integral for the RL wheel and the gain integral for the RR wheel in the frequency band F5; and the gain integral for the RL wheel and the gain integral for the RR wheel in the frequency band F6.

The frequency characteristic ratio calculation unit 24 then calculates the front-to-rear gain ratios R1 and R2 as the front-to-rear frequency characteristic ratios and the left-to-right gain ratios R3 to R6 as the front-to-rear frequency characteristic ratios based on the twelve gain integrals calculated in step S5 (step S6).

The load ratio calculation unit 25 then reads the coefficients a to f from the storage device 15 or the ROM 13, and calculates the front-to-rear load ratio L1, the first left-to-right load ratio L2, and the second left-to-right load ratio L3 based on (1) to (3) described above (step S7).

The wheel load calculation unit 26 calculates a front axle load ratio x and a rear axle load ratio y, and calculates wheel load ratios $L_{FL}$, $L_{FR}$, $L_{RL}$, and $L_{RR}$ based on x and y (step S8). The front axle load ratio x is the ratio of the sum of the wheel loads of the two front wheels with respect to the total weight M of the vehicle 1. The rear axle load ratio y is the ratio of the sum of the wheel loads of the two rear wheels with respect to the total weight M of the vehicle 1. x and y are calculated by the following equations.

$$x=1/(1+L1)$$

$$y=1-x=L1/(1+L1)$$

The wheel load ratios $L_{FL}$, $L_{FR}$, $L_{RL}$, and $L_{RR}$ calculated herein are indices representing relative wheel loads of the wheels FL, FR, RL, and RR, respectively. The wheel load ratios $L_{FL}$, $L_{FR}$, $L_{RL}$, and $L_{RR}$ of the present embodiment are defined as ratios of the total weight M of the vehicle 1 occupied by the wheel loads of the wheels FL, FR, RL, and RR, respectively, and are calculated according to the following equations.

$$L_{FL}=X/(1+L2)$$

$$L_{FR}=X-L_{FL}$$

$$L_{RL}=y/(1+L3)$$

$$L_{RR}=y-L_{RL}$$

The wheel load calculation unit 26 then calculates the wheel loads of the respective wheels FL, FR, RL, and RR from the wheel load ratios $L_{FL}$, $L_{FR}$, $L_{RL}$, and $L_{RR}$ and the total weight M of the vehicle 1, based on the following equations (step S9).

For FL wheel: $M \times L_{FL}$

For FR wheel: $M \times L_{FR}$

For RL wheel: $M \times L_{RL}$

For RR wheel: $M \times L_{RR}$

Upon completion of the above, the wheel load estimation process is ended. However, the wheel load estimation device 2 may further determine whether there is overloading or imbalanced loading, based on at least one of the wheel load ratios calculated in step S8 and the wheel loads calculated in step S9. The wheel load estimation device 2 may be configured to generate a warning and output the warning via the warning indicator 3 when it is determined that there is at least one of overloading and imbalanced loading.

4. Modifications

Although one embodiment of the present invention has been described above, the present invention is not limited to the embodiment described above, and various modifications are still possible within the scope not departing from the gist thereof. For example, the following modifications are possible. The gist of the following modifications may be combined as appropriate.

(1)

In the above embodiment, the wheel loads of the respective wheels are calculated using the wheel load ratios $L_{FL}$, $L_{FR}$, $L_{RL}$, and $L_{RR}$ and the total weight M of the vehicle 1. However, steps S2, S3, and S9 may be omitted when only the wheel load ratios are required.

(2)

The wheel load estimation device for a tire according to the embodiment described above is not limited to the four-wheeled vehicle of any particular driving system, and may be applied to any of an FF vehicle, an FR vehicle, an MR vehicle, and a 4WD vehicle. The present invention are also not only applicable to four-wheeled vehicles but also to three-wheeled vehicles or six-wheeled vehicles.

(3)

In the above embodiment, the wheel load ratios and the wheel loads are calculated for all of the respective wheels, but may also be calculated only for some of the wheels FL, FR, RL, and RR.

(4)

In the above embodiment, two specific frequency bands are determined, but the number of specific frequency bands may be three or more, and three or more coefficients may be identified in advance, in at least one of the equations (1) to (3) for calculating the front-to-rear load ratio L1, the first left-to-right load ratio L2, and the second left-to-right load ratio L3, respectively.

EXAMPLES

Conditions of Experiment

A gasoline hybrid front-engine front-drive (FF) four-wheeled vehicle equipped with summer tires having a size of 205/50R17 was driven on an asphalt road surface under various loading conditions in Table 1. The total weight of the vehicle and the wheel load of each wheel in Table 1 are measurements collected by a wheel load meter laid under the tires.

TABLE 1

| Loading condition | Total weight, kg | FL load, kg | FR load, kg | RL load, kg | RR load, kg |
|---|---|---|---|---|---|
| One person in vehicle | 1352 | 419 | 384 | 279 | 279 |
| Moderately loaded (balanced) | 1562 | 437 | 418 | 350 | 336 |
| Moderately loaded (imbalanced on right side) | 1563 | 416 | 441 | 326 | 357 |
| Moderately loaded (imbalanced on left side) | 1563 | 454 | 376 | 397 | 380 |
| Moderately loaded (imbalanced on rear side) | 1563 | 431 | 404 | 365 | 363 |
| Fully loaded (balanced) | 1613 | 431 | 422 | 372 | 388 |
| Fully loaded (imbalanced on right side) | 1612 | 414 | 439 | 352 | 407 |
| Fully loaded (imbalanced on left side) | 1612 | 461 | 363 | 435 | 353 |
| Fully loaded (imbalanced on rear side) | 1613 | 441 | 402 | 393 | 377 |

Results of Experiment

Table 2 indicates estimation results of the total weight of the vehicle and the wheel loads of the respective wheels, estimated using the wheel load estimation process according to the embodiment described above, based on sampling data collected while the vehicle was driven as described above. The number on the bottom in each cell in Table 2 shows an estimation error, in percentage, with respect to the corresponding measurement in Table 1.

TABLE 2

| Loading condition | Total weight, kg | FL load, kg | FR load, kg | RL load, kg | RR load, kg |
|---|---|---|---|---|---|
| One person in vehicle | 1356 (+0.32%) | 417 (−0.37%) | 402 (+4.60%) | 265 (−4.87%) | 271 (+0.66%) |
| Moderately loaded (balanced) | 1586 (+1.52%) | 451 (−3.25%) | 428 (+2.32%) | 349 (−0.40%) | 358 (+0.35%) |
| Moderately loaded (imbalanced on right side) | 1562 (−0.074%) | 435 (−4.16%) | 454 (+2.91%) | 303 (−7.00%) | 363 (−4.48%) |
| Moderately loaded (imbalanced on left side) | 1496 (−4.27%) | 432 (+4.85%) | 377 (+0.37%) | 359 (−9.57%) | 334 (−0.47%) |
| Moderately loaded (imbalanced on rear side) | 1573 (+0.65%) | 449 (+4.29%) | 401 (−0.66%) | 359 (−1.63%) | 363 (+0.06%) |
| Fully loaded (balanced) | 1633 (+1.24%) | 457 (−5.96%) | 432 (+2.31%) | 361 (−2.86%) | 383 (−1.22%) |
| Fully loaded (imbalanced on right side) | 1651 (+2.44%) | 451 (+8.98%) | 460 (+4.90%) | 360 (+2.33%) | 379 (−6.79%) |
| Fully loaded (imbalanced on left side) | 1561 (−3.14%) | 438 (−5.01%) | 378 (+4.23%) | 401 (−8.04%) | 344 (−2.55%) |
| Fully loaded (imbalanced on rear side) | 1620 (+0.42%) | 455 (+3.20%) | 417 (+3.79%) | 363 (+1.96%) | 384 (+1.96%) |

Table 3 indicates estimation results of the total weight of the vehicle and the wheel load of the respective wheels, estimated using the method disclosed in JP 2019-113373A (a method according to a comparative example) under the same loading condition. The same algorithm was used in estimating the total weight of the vehicle, so that the data thereof has remained the same in the example and the comparative example. The number on the bottom in each cell in Table 3 shows an estimation error, in percentage, with respect to the corresponding measurement in Table 1.

TABLE 3

| Loading condition | Total weight, kg | FL load, kg | FR load, kg | RL load, kg | RR load, kg |
|---|---|---|---|---|---|
| One person in vehicle | 1356 | 360 | 367 | 307 | 322 |
|  | (+0.32%) | (−13.87%) | (−4.31%) | (+10.03%) | (+19.19%) |
| Moderately loaded (balanced) | 1586 | 408 | 409 | 378 | 388 |
|  | (+1.52%) | (−5.92%) | (−2.10%) | (+7.92%) | (+8.80%) |
| Moderately loaded (imbalanced on right side) | 1562 | 391 | 424 | 350 | 390 |
|  | (−0.074%) | (−5.48%) | (−3.83%) | (+7.34%) | (+2.58%) |
| Moderately loaded (imbalanced on left side) | 1496 | 396 | 345 | 408 | 356 |
|  | (−4.27%) | (−12.81%) | (−8.20%) | (+2.68%) | (+5.94%) |
| Moderately loaded (imbalanced on rear side) | 1573 | 401 | 382 | 392 | 372 |
|  | (+0.65%) | (−6.98%) | (−5.54%) | (+7.31%) | (+2.69%) |
| Fully loaded (balanced) | 1633 | 405 | 421 | 405 | 420 |
|  | (+1.24%) | (−5.94%) | (−0.35%) | (+8.89%) | (+8.30%) |
| Fully loaded (imbalanced on right side) | 1651 | 383 | 412 | 397 | 458 |
|  | (+2.44%) | (−7.43%) | (−7.17%) | (+12.85%) | (+12.59%) |
| Fully loaded (imbalanced on left side) | 1561 | 392 | 355 | 419 | 380 |
|  | (−3.14%) | (−14.9%) | (−2.24%) | (−3.63%) | (+7.54%) |
| Fully loaded (imbalanced on rear side) | 1620 | 405 | 401 | 407 | 408 |
|  | (+0.42%) | (−8.22%) | (−0.22%) | (3.56%) | (+8.16%) |

FIGS. 9A to 9D are graphs showing the errors in the estimation results of the wheel loads of the respective wheels FL, FR, RL, and RR in the example, and the errors in the estimation results of the wheel loads in the comparative example. The above results indicate that the accuracy of the algorithm of the wheel load estimation process according to the example is comprehensively high.

REFERENCE SIGNS LIST

1 Vehicle
2 Wheel load estimation device (computer)
21 Wheel speed acquisition unit
22 Torque acquisition unit
23 Total weight calculation unit
24 Frequency characteristic ratio calculation unit
25 Load ratio calculation unit
26 Wheel load calculation unit
6 Wheel speed sensor
FL Front left wheel
FR Front right wheel
RL Rear left wheel
RR Rear right wheel
V1 Wheel speed of front left wheel
V2 Wheel speed of front right wheel
V3 Wheel speed of rear left wheel
V4 Wheel speed of rear right wheel
A1 Acceleration of front left wheel
A2 Acceleration of front right wheel
A3 Acceleration of rear left wheel
A4 Acceleration of rear right wheel
R1 Front-to-rear frequency characteristic ratio
R2 Left-to-right frequency characteristic ratio
L1 Front-to-rear load ratio
L2 Left-to-right load ratio
$L_{FL}$ Wheel load ratio of front left wheel
$L_{FR}$ Wheel load ratio of front right wheel
$L_{RL}$ Wheel load ratio of rear left wheel
$L_{RR}$ Wheel load ratio of rear right wheel
M Total weight of vehicle

The invention claimed is:

1. A wheel load estimation device that estimates a wheel load of a vehicle, the wheel load estimation device comprising:
a wheel speed acquisition unit that acquires wheel speed information of each wheel included in the vehicle, from a wheel speed sensor mounted on the vehicle;
a frequency characteristic ratio calculation unit that calculates, based on the wheel speed information, a front-to-rear frequency characteristic ratio that changes with a change in a front-to-rear load ratio that is a ratio between a load exerted on a front wheel of the vehicle and a load exerted on a rear wheel of the vehicle, and a left-to-right frequency characteristic ratio that changes with a change in a left-to-right load ratio that is a ratio between a load exerted on a left wheel of the vehicle and a load exerted on a right wheel of the vehicle;
a load ratio calculation unit that calculates the front-to-rear load ratio and the left-to-right load ratio based on the front-to-rear frequency characteristic ratio and the left-to-right frequency characteristic ratio, respectively; and
a wheel load calculation unit that calculates a wheel load ratio representing a relative wheel load among the wheels included in the vehicle, for at least one of the wheels of the vehicle, based on the front-to-rear load ratio and the left-to-right load ratio,
wherein the frequency characteristic ratio calculation unit calculates, as the front-to-rear frequency characteristic ratio, a front-to-rear gain ratio that is a ratio of a gain in a frequency spectrum of acceleration of a front wheel with respect to a gain in a frequency spectrum of acceleration of a rear wheel at two or more specific frequencies, and calculates, as the left-to-right frequency characteristic ratio, a left-to-right gain ratio that is a ratio of the gain in a frequency spectrum of acceleration of a left wheel to the gain in a frequency spectrum of acceleration of a right wheel at two or more specific frequencies;

the load ratio calculation unit calculates the front-to-rear load ratio by taking a linear combination of the calculated two or more front-to-rear gain ratios using weights that are different from one another, and calculates the left-to-right load ratio by taking a linear combination of the calculated two or more left-to-right gain ratios with weights that are different from one another; and the wheel load estimation device is configured to transmit the calculated wheel load ratio to a brake control system to control braking or to a tire pressure monitoring system mounted on wheels of the vehicle to determine a drop in a tire pressure.

2. The wheel load estimation device according to claim 1, further comprising a total weight calculation unit that identifies a total weight of the vehicle that is travelling, wherein the wheel load calculation unit calculates the wheel load based on the identified total weight of the vehicle and the wheel load ratio.

3. The wheel load estimation device according to claim 1, wherein the wheel load calculation unit calculates the wheel load ratio for each of the wheels included in the vehicle.

4. The wheel load estimation device according to claim 1, wherein the frequency characteristic ratio calculation unit calculates the front-to-rear gain ratio in two or more specific frequency bands, and calculates the left-to-right gain ratio in two or more specific frequency bands.

5. The wheel load estimation device according to claim 2, wherein the wheel load calculation unit calculates the wheel load ratio for each of the wheels included in the vehicle.

6. The wheel load estimation device according to claim 2, wherein the frequency characteristic ratio calculation unit calculates the front-to-rear gain ratio in two or more specific frequency bands, and calculates the left-to-right gain ratio in two or more specific frequency bands.

7. The wheel load estimation device according to claim 3, wherein the frequency characteristic ratio calculation unit calculates the front-to-rear gain ratio in two or more specific frequency bands, and calculates the left-to-right gain ratio in two or more specific frequency bands.

8. A wheel load estimation method for estimating a wheel load of a vehicle, the wheel load estimation method being executed by one or more computers and comprising:

a step of acquiring wheel speed information of each wheel included in the vehicle, from a wheel speed sensor mounted on the vehicle;

a step of calculating, based on the wheel speed information, a front-to-rear frequency characteristic ratio that changes with a change in a front-to-rear load ratio that is a ratio between a load exerted on a front wheel of the vehicle and a load exerted on a rear wheel of the vehicle;

a step of calculating, based on the wheel speed information, a left-to-right frequency characteristic ratio that changes with a change in a left-to-right load ratio that is a ratio between a load exerted on a left wheel of the vehicle and a load exerted on a right wheel of the vehicle;

a step of calculating the front-to-rear load ratio and the left-to-right load ratio based on the front-to-rear frequency characteristic ratio and the left-to-right frequency characteristic ratio, respectively;

a step of calculating a wheel load ratio representing a relative wheel load among the wheels included in the vehicle, for at least one of the wheels of the vehicle, based on the front-to-rear load ratio and the left-to-right load ratio; and a step of transmitting the calculated wheel load ratio to a brake control system to control braking or to a tire pressure monitoring system mounted on wheels of the vehicle to determine a drop in a tire pressure, wherein the step of calculating the front-to-rear frequency characteristic ratio is a step of calculating a front-to-rear gain ratio that is a ratio of a gain in a frequency spectrum of acceleration of a front wheel with respect to a gain in a frequency spectrum of acceleration of a rear wheel at two or more specific frequencies, the step of calculating the left-to-right frequency characteristic ratio is a step of calculating a left-to-right gain ratio that is a ratio of the gain in a frequency spectrum of acceleration of a left wheel to the gain in a frequency spectrum of acceleration of a right wheel at two or more specific frequencies, and the step of calculating the front-to-rear load ratio and the left-to-right load ratio is a step of calculating the front-to-rear load ratio by taking a linear combination of the calculated two or more front-to-rear gain ratios using weights that are different from one another, and calculating the left-to-right load ratio by taking a linear combination of the calculated two or more left-to-right gain ratios with weights that are different from one another.

9. A non-transitory computer-readable medium storing a wheel load estimation program for estimating a wheel load of a vehicle, the wheel load estimation program causing one or more computers to execute:

a step of acquiring wheel speed information of each wheel included in the vehicle, from a wheel speed sensor mounted on the vehicle;

a step of calculating, based on the wheel speed information, a front-to-rear frequency characteristic ratio that changes with a change in a front-to-rear load ratio that is a ratio between a load exerted on a front wheel of the vehicle and a load exerted on a rear wheel of the vehicle;

a step of calculating a left-to-right frequency characteristic ratio that changes with a change in a left-to-right load ratio that is a ratio between a load exerted on a left wheel of the vehicle and a load exerted on a right wheel of the vehicle;

a step of calculating the front-to-rear load ratio and the left-to-right load ratio based on the front-to-rear frequency characteristic ratio and the left-to-right frequency characteristic ratio, respectively;

a step of calculating a wheel load ratio representing a relative wheel load among the wheels included in the vehicle, for at least one of the wheels of the vehicle, based on the front-to-rear load ratio and the left-to-right load ratio; and a step of transmitting the calculated wheel load ratio to a brake control system to control braking or to a tire pressure monitoring system mounted on wheels of the vehicle to determine a drop in a tire pressure, wherein the step of calculating the front-to-rear frequency characteristic ratio is a step of calculating a front-to-rear gain ratio that is a ratio of a gain in a frequency spectrum of acceleration of a front wheel with respect to a gain in a frequency spectrum of acceleration of a rear wheel at two or more specific frequencies, the step of calculating the left-to-right frequency characteristic ratio is a step of calculating a left-to-right gain ratio that is a ratio of the gain in a frequency spectrum of acceleration of a left wheel to the gain in a frequency spectrum of acceleration of a right wheel at two or more specific frequencies, and the step of calculating the front-to-rear load ratio and the left-to-right load ratio is a step of calculating the front-to-rear load ratio by taking a linear combination of the calculated two or more front-to-rear gain ratios using weights that are different from one another, and calculating the left-to-right load ratio by taking a linear combination of the calculated two or more left-to-right gain ratios with weights that are different from one another.

\* \* \* \* \*